United States Patent [19]

Stewart, Jr.

[11] 4,208,797

[45] Jun. 24, 1980

[54] APPARATUS FOR DIMENSIONAL GAUGING OF ANGULAR MEMBERS

[75] Inventor: Charles J. Stewart, Jr., Clark Lake, Mich.

[73] Assignee: Commonwealth Associates Inc., Jackson, Mich.

[21] Appl. No.: 950,256

[22] Filed: Oct. 10, 1978

[51] Int. Cl.$^2$ .................... G01B 5/00; G01B 5/14; F16B 33/00
[52] U.S. Cl. .................................... 33/180 R; 85/1 R
[58] Field of Search ............... 33/1 G, 137 R, 180 R, 33/86; 85/1 R, 1 K, 1 P, 1 S

[56] References Cited

U.S. PATENT DOCUMENTS

| | | | |
|---|---|---|---|
| 279,000 | 6/1883 | Moran | 85/1 R |
| 2,163,808 | 6/1939 | Pithoud | 33/180 R |
| 2,704,357 | 3/1955 | Johnson | 85/1 R |
| 2,711,030 | 6/1955 | Drew et al. | 33/137 R |
| 3,219,308 | 11/1965 | Halstead | 33/180 R |
| 3,472,301 | 10/1969 | Pearce, Jr. | 85/1 R |

FOREIGN PATENT DOCUMENTS 1300851 7/1962 France.
43650 2/1918 Sweden.
381815 8/1973 U.S.S.R.

*Primary Examiner*—Richard R. Stearns
*Attorney, Agent, or Firm*—Beaman and Beaman

[57] ABSTRACT

The invention pertains to apparatus for gauging the relative relationship between angular construction members, and particularly pertains to apparatus for measuring stub angle supports used with electrical transmission towers. The apparatus consists of a pair of threaded shafts each including a radial shoulder and a nut wherein each shaft may be received within corresponding holes formed in the planar portions of the angular member to be measured. The shafts are axially bored to slidably receive an anchor shaft having a measuring tape anchor defined thereon, the anchors of the pair of anchor shafts adapted to engage for diagonal measurements, and keying means defined on the anchor shafts and the associated threaded shaft prevent rotation of these components when the tape anchor is disposed adjacent the threaded shaft end.

10 Claims, 6 Drawing Figures

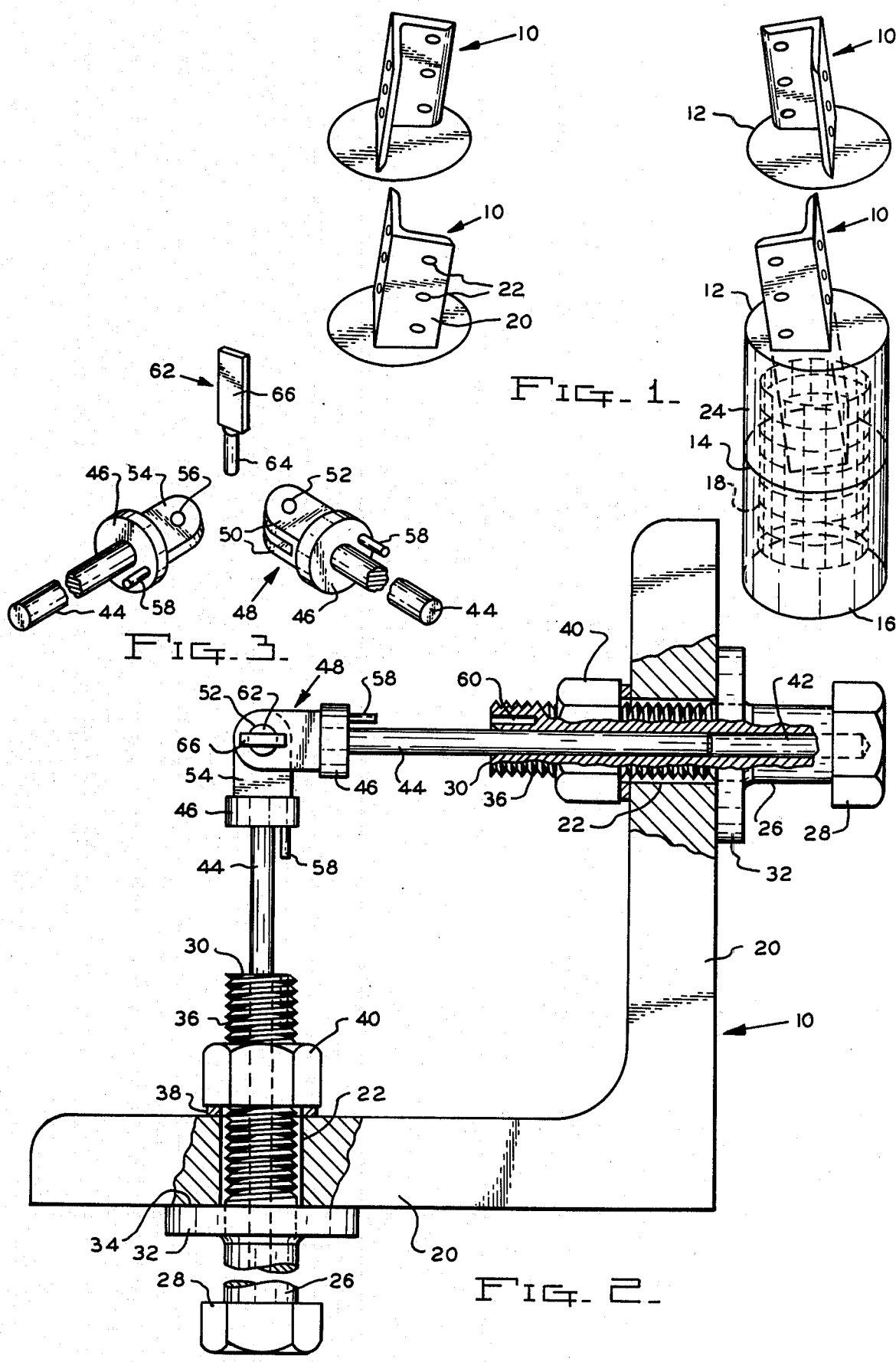

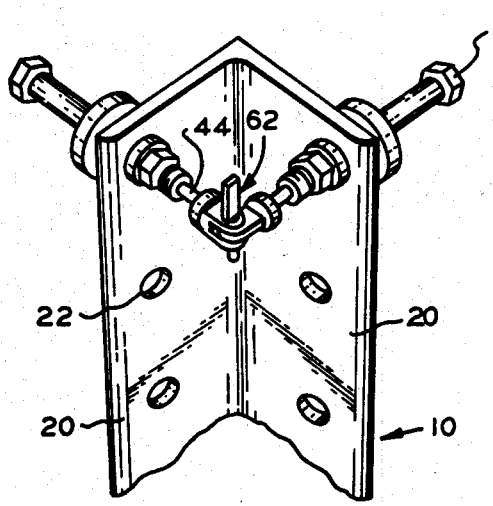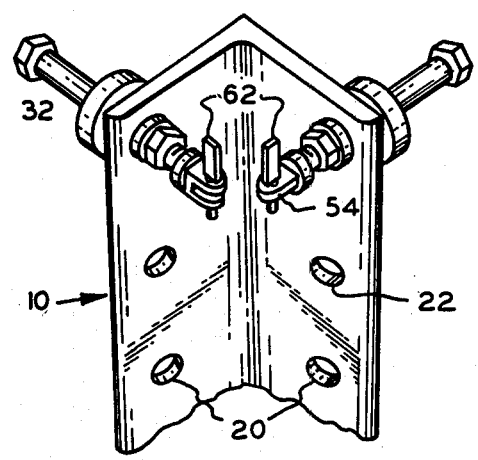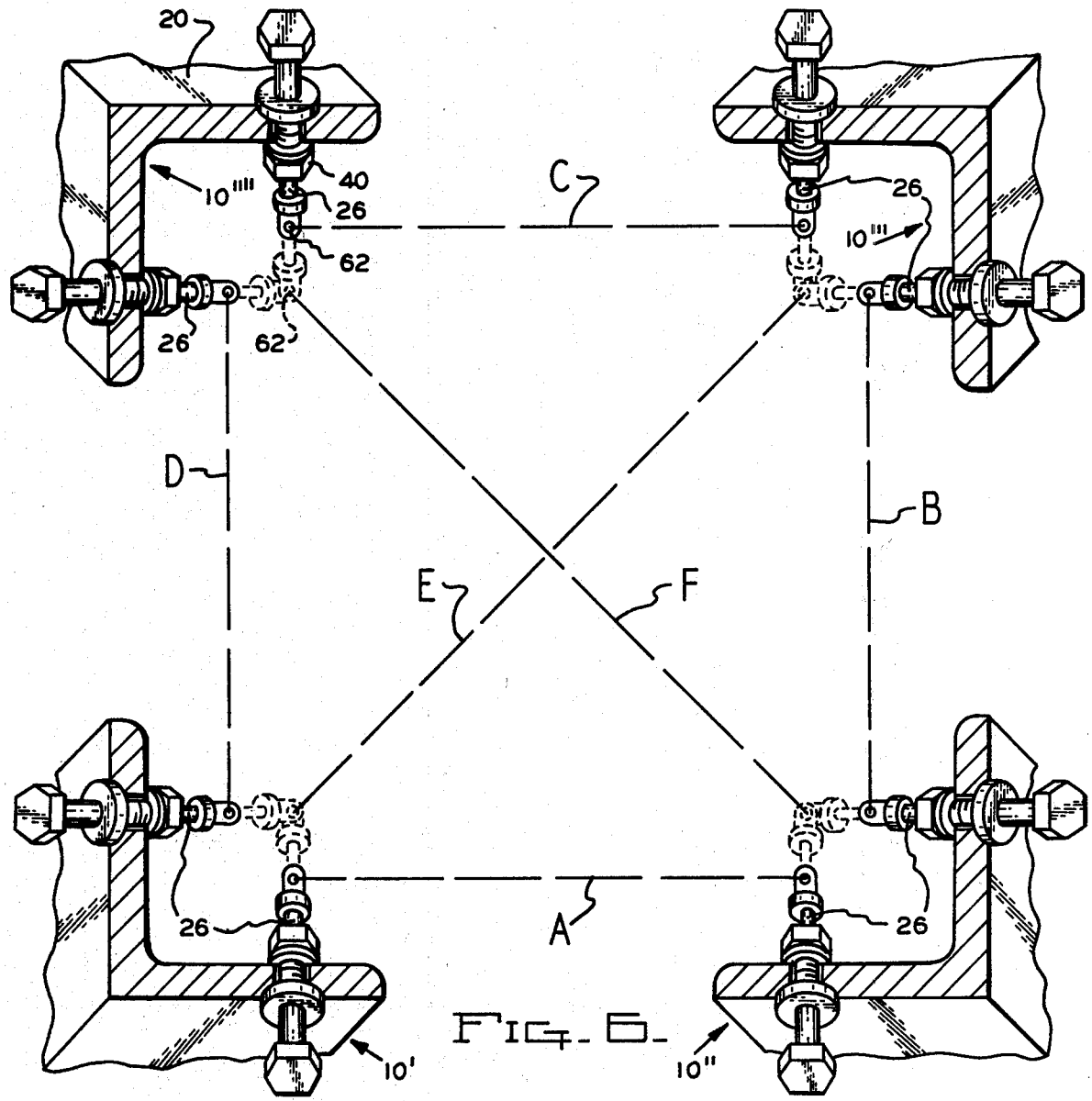

4,208,797

APPARATUS FOR DIMENSIONAL GAUGING OF ANGULAR MEMBERS

BRIEF DESCRIPTION OF THE INVENTION

The invention pertains to the field of measurement apparatus utilized to accurately locate and measure angular construction members, and is particularly suitable for locating and inspecting stub angle supports used with electrical power transmission towers.

Transmission towers utilized to support high voltage electrical conductors range in height from 80 to 200 feet, and are primarily composed of interconnected steel angular construction elements, commonly referred to as "angle iron". Such transmission towers are commonly supported upon concrete foundations which include angle iron elements embedded into concrete having upper portions extending from the concrete foundation having holes defined in the flanges of the elements, such foundation elements commonly being known as "stub angles". Stub angles must be very accurately located relative to each other in order to insure proper support and installation of the transmission tower, and as it is now common to preassemble the majority of the tower prior to installation on the stub angles accurate positioning and installation of the stub angles is critical.

In the past, various systems have been used to measure transmission tower stub angles, for instance, predetermined locations at the exterior intersection edge of the flanges are utilized as reference points and measurement tape anchor locations. Also, jigs have been used to hold the four stub angles constituting the support of a transmission tower during pouring of the concrete foundation, but such previous measurements or jigs have not been entirely satisfactory in that their use requires several workmen, and jigs cannot be universally employed in all installations. It is not uncommon for a stub angle to be misaligned during measurement or pouring of the concrete, requiring that the concrete be chipped away to release the misaligned stub angle and requiring expensive realigning and resetting procedures.

It is an object of the invention to provide a gauging apparatus for structural angle members wherein angle members may be accurately positioned, and wherein use of the apparatus requires only a single operator.

Another object of the invention is to provide dimensional gauging apparatus suitable for use in transmission tower stub angle installation which permits the stub angle to be accurately positioned prior to encasement within concrete, and wherein dimensioning solely by the use of a measuring tape and one-man operation is achieved.

Yet another object of the invention is to provide dimensional gauging apparatus for constructional angle members which is of an economical construction, may be used by construction personnel with a minimum of special skills and minimizes personnel requirements.

In the practice of the invention the dimensional apparatus consists of a pair of elongated threaded shafts used with each angle member or stub angle. By means of radial shoulders and nuts defined upon the threaded shafts the shafts may be firmly affixed within corresponding holes defined in the angle member flanges. Each of the threaded shafts is provided with an axial bore intersecting the shaft end within the included angle defined by the angle flanges and an anchor shaft slidably received within these bores each includes a clevis component whereby positioning of the anchor shafts permits the clevises of the pair to be interconnected by a combination pivot and measuring tape anchor pin. When the anchor is located a predetermined position relative to the associated angle member is achieved for measurement purposes.

Key means are defined upon the anchor shafts associating with engaging key means on the threaded shaft wherein relative rotation between the threaded and anchor is prevented at the anchor shaft retracted position. The tape anchor pin may be received within the openings of the keyed clevis wherein accurate measurement between adjacent angle members is accomplished.

BRIEF DESCRIPTION OF THE DRAWINGS

The objects and advantages of the inventive concepts will be apparent from the following description and accompanying drawings wherein:

FIG. 1 is an illustration of a typical transmission tower stub angle installation, one of the foundations being shown in section, FIG. 2 is a plan, elevational, sectional view taken through an angle member with dimensional apparatus in accord with the invention installed thereon, FIG. 3 is a partial perspective view illustrating the clevis members of the anchor shafts and the measuring tape pin, FIG. 4 is a perspective view of an angle member illustrating the clevis members interconnected by the measurement tape anchor pin, FIG. 5 is a perspective view similar to FIG. 4 illustrating the clevis members and anchor shafts in the retracted position, and FIG. 6 is a plan, schematic view illustrating the manner in which measurements are taken of a stub angle installation utilizing the apparatus of the invention.

DESCRIPTION OF THE PREFERRED EMBODIMENT

The use of the invention can be best understood from the illustration of FIG. 1 wherein a typical electrical transmission tower foundation arrangement is illustrated. Basically, the tower foundation consists of four stub angles 10 encased within concrete and accurately located in a rectangular orientation wherein the legs of the tower, not shown, may be attached to the stub angles by bolts extending through holes defined in the stub angle flanges and the flanges of the tower legs.

Each of the stub angles is mounted within a hole 12 which may be as deep as thirty feet, and is approximately 3 feet in diameter. The majority of the hole is filled with concrete to the level 14 to form a foundation, FIG. 1, and an annular cage 18 of reinforcing steel is located within the hole prior to the introduction of the concrete to form the foundation. After the concrete has hardened a stub angle 10, consisting of a linear angle iron several feet in length, is inserted within the annular configuration of the reinforcement cage 18 and rests upon the foundation surface 14. The length of the stub angle 10, and the width of the flanges 20, will vary according to the size of the transmission tower to be supported and the tower specifications, and the flange widths may vary from three to twelve inches. A plurality of holes 22 are formed in the flanges of the stub angle in a standard pattern wherein corresponding holes appear in each flange of a common stub angle.

Gauging apparatus in accord with the invention is affixed to the stub angles 10 prior to encasing the stub angles in concrete, and after the stub angles 10 have been located within the associated reinforcing cage the dimensional apparatus of the invention is mounted upon the stub angles and the stub angles are positioned as determined during the measurement process. The stub angles 10 are vertically positioned by means of leveling devices, and are horizontally positioned by utilizing the measurement apparatus of the invention and a measuring tape. When the stub angles are positioned as desired within each hole 12 the angles are wired and then tack welded to the reinforcement cage such that the pouring of the concrete 24 about the stub angle does not displace the stub angle from its desired position. The stub angle hole is substantially filled with concrete and as the reinforcing cage is now fully encased within concrete a high strength support for each stub angle 10 is achieved.

The dimensional gauging apparatus in accord with the invention consists of a pair of elongated threaded shaft members 26 associated with each stub angle. Since the threaded shafts are identical it is only necessary to describe a single shaft as set forth below.

The threaded shaft 26 is of cylindrical configuration having a diameter approximately one-sixteenth of an inch less than the diameter of the flange holes 22. The shaft includes a hex head 28, an inner end 30, and a radial collar 32 defining the abutment shoulder surface 34. The collar 32 is welded or otherwise affixed to the shaft, and threads 36 extend between the collar and the end 30. Upon the threaded end of the shaft being inserted into the flange hole 22 the washer 38 and nut 40 threaded upon threads 36 firmly affixes the shaft to the associated flange 20.

The shafts 26 are each provided with an axial cylindrical bore 42 which intersects the associated shaft end 30. The bore 42 closely slidably receives a cylindrical anchor shaft 44, and the shafts 44 include connection and measurement tape anchor means defined upon their outer ends.

In the disclosed embodiment the connection means takes the form of a clevis wherein the connection means includes a cylindrical head 46 affixed to the end of the slide shaft 44 and on one head a clevis yoke 48 is formed consisting of a pair of spaced parallel ears 50 each having an aligned hole 52 defined therein having an axis perpendicularly disposed to the axis of the associated shaft. The other slide shaft head of the pair includes a clevis tongue 54 adapted to be closely received within the yoke 48 and having a hole 56 defined therein for alignment with the holes 52 of the yoke 48.

As will be apparent from FIG. 3, each clevis head 46 is provided with an axially extending projection in the form of a pin 58 which is radially spaced from the associated shaft 44. The end 30 of each threaded shaft is provided with a cylindrical hole 60, FIG. 2, adapted to closely receive the associated projection 58, and in this manner, the associated anchor shaft will be restrained against rotation relative to its threaded shaft when the anchor shaft is in a retracted position and the pin 58 is received within its hole 60. When assembling the threaded shafts to the stub angle flanges, the threaded shafts are angularly oriented such that when the associated pin 58 is received within its hole the axis of the holes 52 or 56 in the connection means will be vertically oriented, and such orientation assures proper measurement when determining distances between adjacent stub angles.

Use of the dimensional gauging apparatus in accord with the invention will now be explained. It is to be appreciated that the gauging initially occurs as the four stub angles 10 constituting the support for a transmission tower are oriented prior to pouring of the concrete encasement 24. However, the following use of apparatus is also employed after the stub angles are encased in concrete to check the stub angle spacing for inspection purposes.

A pair of threaded shafts 26 are located within corresponding flange holes 22 of each stub angle constituting the support for a common transmission tower, eight shafts 26 in all. In each pair, one of the anchor shafts 44 will include the yoke 48, while the other will include the tongue 54, and when orienting the threaded shafts within the flange holes 22 the anchor shafts are positioned to their retracted condition wherein the axes of the associated holes 52 and 56 will be vertically oriented when the projection 58 is received within hole 60. Tightening of nut 40 will assure this orientation.

Once the threaded rods have been tightened to each of the four stub angles 10 measurements can now take place. If the initial measurement is between adjacent stub angles, this measurement is taken by placing the tape anchor pins 62 in the holes 52 and 56 while the associated anchor shaft 44 is in its retracted position preventing rotation thereof relative to the associated threaded shaft. The tape anchor pins 62 includes a cylindrical portion 64 for close reception within the holes 52 and 56, and the upper portion of the pin is flattened as at 66 to provide a surface against which the hook at the end of a tape measure may be placed. An anchor pin 62 is located in threaded shaft 44, as in FIG. 5, and an accurate measurement A can be taken between adjacent stub angles 10' and 10".

The next measurement step is the distance indicated at B, FIG. 6, and in this instance the associated anchor shafts will also be fully retracted so that a measurement between the pins 62 will be accurate in view of the vertical pin orientation. In a like manner measurement C is taken between stub angles 10''' and 10'''', and measurement D is taken between stub angles 10'''' and 10'.

To make the diagonal measurements E and F the anchor shafts 44 of the pair of threaded shafts associated with a common stub angle are extended until the axis of the openings 52 coincide with the axis of the clevis tongue 56 wherein the tongue is located between the ears of the yoke 48. At this time an anchor pin 62 may be inserted through the openings 52 and 56, FIG. 4, establishing a measurement point intermediate the flanges of the associated stub angle within the included angle defined by the flanges. In a like manner each of the four pairs of threaded shafts are adjusted wherein the slide shafts are extended and the anchor pins 62 inserted to interconnect the clevis portions of the associated threaded shaft pairs. The measurements E and F can then be taken by means of a tape measure, and whether the measurements are taken for initial installation or inspection purposes the accuracy is assured due to the firm and positive manner in which the anchor pins are held during measurement.

When using the apparatus of the invention the specifications for stub angle installment will be in terms of those dimensions required when using the disclosed gauging apparatus, and as the location of the stub angle flange holes 22 is known the dimensions specified will result in the proper spacing of stub angles to permit the proper erection of the transmission tower. The aforedescribed measurements can readily be accomplished by one operator, and the use of the firmly anchored tape pins 62 for all measurements assures a higher degree of accuracy than was heretofore achievable by several operators using previous measuring techniques.

It is appreciated that various modifications to the inventive concepts may be apparent to those skilled in the art without departing from the spirit and scope of the invention.

I claim:

1. A dimensional gauge for angular members having a pair of angularly related flange portions having corresponding holes defined therein comprising, in combination, a pair of threaded shafts each having a longitudinal axis, an end and a shoulder transversely disposed to said axis and axially spaced from said end, a nut threaded upon each shaft whereby the shaft may be inserted into a flange portion hole and mounted by said nut and shoulder, an axial bore defined in each shaft intersecting said end thereof, an anchor shaft axially slidably received within each shaft bore axially positionable between operable extended and fully retracted positions and having an outer end located exteriorly of the associated bore when said shafts are fully retracted into their associated bore, means defined on said anchor shafts outer ends engaging the associated threaded shaft end in said fully retracted position, connection means defined on said anchor shafts' outer ends for connecting said outer ends together, and measurement tape anchor means defined on said connection means.

2. A dimensional gauge for angular members as in claim 1 wherein said connection means includes a hole defined in said anchor shafts' outer ends having an axis substantially perpendicular to the length of the associated anchor shaft, and said tape anchor means comprising a pin closely received within said anchor shafts' outer end holes.

3. A dimensional gauge for angular members as in claim 2, said pin including a cylindrical axially extending portion received within said anchor shafts' outer end holes and a flat axially extending portion adapted to receive a measuring tape hook.

4. A dimensional gauge for angular members as in claim 2 wherein said connection means comprises a clevis yoke defined on one of said anchor shafts' outer ends and a clevis tongue adapted to be received within said clevis yoke defined on the other anchor shaft outer end.

5. A dimensional gauge for angular members as in claim 2, key means defined on said anchor shafts' outer end and threaded shafts' end, said key means of an associated anchor shaft and threaded shaft engaging to prevent rotation of the anchor shaft relative to the associated threaded shaft when the anchor shaft outer end is adjacent said end of the associated threaded shaft.

6. A dimensional gauge for angular members as in claim 5 wherein said key means includes a projection defined on said anchor shafts' outer end radially spaced from the longitudinal axis thereof and an axially extending projection receiving recess defined in said threaded shaft end radially spaced from the axis of said threaded shaft.

7. A dimensional gauge for angular members having a pair of angularly related flange portions having corresponding holes defined therein comprising, in combination, a threaded shaft having a longitudinal axis, an end and a shoulder transversely disposed to said axis and axially spaced from said end, a nut threaded upon said shaft whereby the shaft may be inserted into a flange portion hole and mounted by said nut and shoulder, an axial bore defined in said shaft intersecting said end thereof, an anchor shaft axially slidably received within said shaft bore axially positionable between operable extended and fully retracted positions and having an outer end located exteriorly of the associated bore when said shaft is fully retracted into its bore, means defined on said anchor shaft outer end engaging said threaded shaft end in said fully retracted position, and a tape measure anchor pin mounted on said shaft's outer end.

8. A dimensional gauge for angular members as in claim 7, key means defined on said anchor shaft's outer end and threaded shaft's end, said key means of said anchor shaft and threaded shaft engaging to prevent rotation of said anchor shaft relative to said threaded shaft when the anchor shaft outer end is adjacent said end of the associated threaded shaft.

9. A dimensional gauge for angular members as in claim 8 wherein said key means includes a projection defined on said anchor shaft's outer end radially spaced from the longitudinal axis thereof and an axially extending projection receiving recess defined in said threaded shaft end radially spaced from the axis of said threaded shaft.

10. The method of measuring the relative dimensional spaced relationship between a plurality of right angle construction members comprising a set, each member consisting of a pair of perpendicularly disposed planar portions having corresponding holes defined therein, comprising the steps of inserting and fixing gauge members into corresponding holes in the planar portions wherein the length of the gauge members is perpendicular to the planar portions, interconnecting said gauge members at a reference location spaced from the planar portions and within the 90° angle defined by the planar portions and measuring from said reference location to the reference location of like construction members constituting the set.

* * * * *